US010408281B2

United States Patent
Fukunari et al.

(10) Patent No.: US 10,408,281 B2
(45) Date of Patent: Sep. 10, 2019

(54) ROTATION TRANSMISSION DEVICE

(71) Applicant: NTN CORPORATION, Osaka (JP)

(72) Inventors: Marina Fukunari, Shizuoka (JP); Takahide Saito, Shizuoka (JP); Koji Sato, Shizuoka (JP); Makoto Tokuda, Shizuoka (JP); Kyohei Sasanuma, Shizuoka (JP); Motohiro Tada, Shizuoka (JP); Naotsugu Kitayama, Shizuoka (JP)

(73) Assignee: NTN CORPORATION, Osaka (JP)

( * ) Notice: Subject to any disclaimer, the term of this patent is extended or adjusted under 35 U.S.C. 154(b) by 512 days.

(21) Appl. No.: 15/113,616

(22) PCT Filed: Jan. 26, 2015

(86) PCT No.: PCT/JP2015/051975
§ 371 (c)(1),
(2) Date: Jul. 22, 2016

(87) PCT Pub. No.: WO2015/115352
PCT Pub. Date: Aug. 6, 2015

(65) Prior Publication Data
US 2017/0009821 A1 Jan. 12, 2017

(30) Foreign Application Priority Data

Jan. 30, 2014 (JP) .................................. 2014-015760

(51) Int. Cl.
*F16D 41/08* (2006.01)
*F16D 27/10* (2006.01)
(Continued)

(52) U.S. Cl.
CPC ........... *F16D 41/088* (2013.01); *F16D 27/10* (2013.01); *F16D 41/066* (2013.01); *F16F 1/376* (2013.01);
(Continued)

(58) Field of Classification Search
CPC .... F16D 41/066; F16D 41/088; F16D 41/105; F16D 27/10; F16D 27/14; F16D 27/112;
(Continued)

(56) References Cited

U.S. PATENT DOCUMENTS 3,565,223 A * 2/1971 Pierce ................. F04B 27/0895
192/107 C
10,151,357 B2 * 12/2018 Kitayama ............... F16D 27/14
(Continued)

FOREIGN PATENT DOCUMENTS

CN 202149171 2/2012
JP 10-54426 2/1998
(Continued)

OTHER PUBLICATIONS

International Preliminary Report on Patentability and Written Opinion of the International Searching Authority dated Aug. 2, 2016 in International (PCT) Application No. PCT/JP2015/051975.
(Continued)

*Primary Examiner* — Richard M Lorence
(74) *Attorney, Agent, or Firm* — Wenderoth, Lind & Ponack, L.L.P.

(57) ABSTRACT

A rotation transmission device is provided in which a collision sound by an armature and a rotor is less likely to occur, and further the armature is stably attracted to the rotor. A buffer is provided between the armature and the rotor. The buffer is constituted by a metal annulus axially movably supported by the armature, and a rubber annulus configured such that as the armature approaches the rotor, the rubber annulus is axially compressed by the metal annulus and the armature. The rubber annulus has different axial thicknesses at different circumferential locations thereof such that when the degree of axial compression of the rubber annulus is large, the rubber annulus is axially compressed in its longer (Continued)

circumferential area than when the degree of axial compression of the rubber annulus is small.

12 Claims, 9 Drawing Sheets

(51) Int. Cl.
*F16D 41/066* (2006.01)
*F16F 1/373* (2006.01)
*F16F 1/376* (2006.01)
*F16D 23/12* (2006.01)
*F16D 27/112* (2006.01)
*F16D 27/14* (2006.01)
*F16D 41/10* (2006.01)

(52) U.S. Cl.
CPC .......... *F16F 1/3732* (2013.01); *F16D 27/112* (2013.01); *F16D 27/14* (2013.01); *F16D 41/105* (2013.01); *F16D 2023/123* (2013.01); *F16D 2300/22* (2013.01)

(58) Field of Classification Search
CPC ............ F16D 2300/22; F16D 2023/123; F16F 1/376; F16F 1/3732
See application file for complete search history.

(56) References Cited

U.S. PATENT DOCUMENTS

| 2008/0079205 A1 | 4/2008 | Hayashi et al. |
| 2011/0061983 A1 | 3/2011 | Sato et al. |
| 2013/0001036 A1 | 1/2013 | Ebuchi et al. |
| 2017/0198760 A1* | 7/2017 | Saito ..................... F16D 27/112 |

FOREIGN PATENT DOCUMENTS

| JP | 10-184729 | 7/1998 |
| JP | 2001-280386 | 10/2001 |
| JP | 2009-8172 | 1/2009 |
| JP | 2009-293654 | 12/2009 |
| JP | 2009-299829 | 12/2009 |
| JP | 2010-14137 | 1/2010 |
| JP | 2013-11285 | 1/2013 |

OTHER PUBLICATIONS

Office Action dated Jan. 30, 2018 in Chinese Application No. 201580006323.4, with English translation of Search Report.
Extended European Search Report dated Jan. 31, 2017 in corresponding European Application No. 15742904.4.

* cited by examiner

ROTATION TRANSMISSION DEVICE

TECHNICAL FIELD

The present invention relates to a rotation transmission device capable of selectively performing and stopping the transmission of rotation.

BACKGROUND ART

As rotation transmission devices capable of selectively performing and stopping the transmission of the rotation of an input shaft to an output shaft, for example, rotation transmission devices as disclosed in Japanese Unexamined Patent Application Publication No. 2009-293654 (hereinafter, JP 2009-293654) and Japanese Unexamined Patent Application Publication No. 2009-008172 (hereinafter JP 2009-008172).

The rotation transmission device disclosed in JP 2009-293654 includes an outer ring, an inner member arranged inside of the outer ring, circumferentially opposed pairs of rollers provided between a cylindrical surface of the inner periphery of the outer ring and respective cam surfaces of the outer periphery of the inner member, spring members pressing the respective pairs of rollers such that the spaces between the respective pairs of rollers widen, and a roller retainer retaining the rollers.

The roller retainer is constituted by two split retainer portions supported so as to be rotatable relative to each other. The two split retainer portions separately support the pairs of rollers such that the spaces between the respective pairs of rollers change with the relative rotation of the two split retainer portions. Also, the two split retainer portions are movable between the engagement position in which the spaces between the respective pairs of rollers are widened so that the pairs of rollers are engaged with the cylindrical surface of the inner periphery of the outer ring and the respective cam surfaces of the outer periphery of the inner member, and the disengagement position in which the spaces between the respective pairs of rollers are narrowed so that the pairs of rollers are disengaged from the cylindrical surface of the inner periphery of the outer ring and the respective cam surfaces of the outer periphery of the inner member.

This rotation transmission device includes, as a means for moving the two split retainer portions from the engagement position to the disengagement position, an axially movably supported armature, a rotor axially opposed to the armature, an electromagnet configured to attract the armature to the rotor when the electromagnet is energized, and a ball ramp mechanism configured to convert the motion of the armature when attracted to the rotor into the movement of the two split retainer portions from the engagement position to the disengagement position.

The armature is biased away from the rotor by the spring force of the above spring members, pressing the respective pairs of rollers. Namely, the pressing force of the above spring members, which press the respective pairs of rollers such that the spaces between the respective pairs of rollers widen, is transmitted, as a circumferential force, to the two split retainer portions. This circumferential force is converted by the ball ramp mechanism into an axial force, and is transmitted to the armature, so that the spring force/load biasing the armature away from the rotor is applied to the armature.

While the electromagnet is de-energized, the rotation transmission device of JP 2009-293654 is in the engaged state in which rotation is transmitted between the outer ring and the inner member. Namely, while the electromagnet is de-energized, since the pairs of rollers are presses by the respective spring members such that the spaces between the respective pairs of rollers widen, the pairs of rollers are kept in engagement with the cylindrical surface of the inner periphery of the outer ring and the respective cam surfaces of the outer periphery of the inner member. When rotation is input to the outer ring or the inner member in this state, the rotation is transmitted between the outer ring and the inner member through the rollers.

On the other hand, while the electromagnet is energized, this rotation transmission device is in the disengaged state (idling state) in which rotation is not transmitted between the outer ring and the inner member. Namely, when the electromagnet is energized, the armature is attracted to the rotor, and due to this motion of the armature, since the two split portions rotate relative to each other such that the spaces between the respective pairs of rollers narrow, the rollers are disengaged from the outer ring and the inner member. If rotation is input to the outer ring or the inner member in this state, the rotation is not transmitted between the outer ring and the inner member.

The rotation transmission device of JP 2009-008172 includes an outer ring, an inner member arranged inside of the outer ring, pairs of rollers provided between a cylindrical surface of the inner periphery of the outer ring and respective cam surfaces of the outer periphery of the inner member, and a roller retainer retaining the rollers. The roller retainer are circumferentially movably supported between the engagement position in which the spaces between the pairs of rollers are engaged with the cylindrical surface of the inner periphery of the outer ring and the respective cam surfaces of the outer periphery of the inner member, and the disengagement position in which the pairs of rollers are disengaged from the cylindrical surface of the inner periphery of the outer ring and the respective cam surfaces of the outer periphery of the inner member. Also, the roller retainer is held in the disengagement position by the spring force of a switch spring.

This rotation transmission device includes, as a means for moving the roller retainer from the disengagement position to the engagement position, an axially movably supported armature, a rotor axially opposed to the armature, a spring member pressing the armature away from the rotor, an electromagnet configured to attract the armature to the rotor when the electromagnet is energized, and a friction clutch mechanism configured to convert the motion of the armature when attracted to the rotor into the movement of the roller retainer from the disengagement position to the engagement position.

While the electromagnet is de-energized, the rotation transmission device of JP 2009-008172 is in the disengaged state (idling state) in which rotation is not transmitted between the outer ring and the inner member. Namely, while the electromagnet is de-energized, since the roller retainer is held in the disengagement position by the switch spring, the rollers are disengaged from the outer ring and the inner member. If rotation is input to the outer ring or the inner member in this state, the rotation is not transmitted between the outer ring and the inner member.

On the other hand, while the electromagnet is energized, this rotation transmission device is in the engaged state in which rotation is transmitted between the outer ring and the inner member. Namely, when the electromagnet is energized, the armature is attracted to the rotor, and due to this motion of the armature, since the roller retainer moves to the engagement position from the disengagement position, the rollers are kept in engagement with the cylindrical surface of the inner periphery of the outer ring and the cam surfaces of the outer periphery of the inner member. When rotation is input to the outer ring or the inner member in this state, the rotation is transmitted between the outer ring and the inner member through the rollers.

In the rotation transmission devices described above, when the armature is attracted to the rotor by energizing the electromagnet, a collision sound arises between the armature and the rotor. Such a collision sound leads to a problem, especially, in the field of automobiles in which high silence is required nowadays (e.g., in the field of backup clutches used for steer-by-wire type steering devices).

In order to reduce the collision sound generated when an armature is attracted to a rotor, the inventors of the present application tried to add a rubber member between an armature and a rotor in a rotation transmission device as disclosed in JP 2009-293654, and performed an evaluation test on this arrangement in their company. As a result of this test, it turned out that if a rubber member is added between an armature and a rotor, the motion of the armature might be made stable.

Namely, when an electromagnet is energized, an armature receives not only the force attracting the armature to a rotor by the energized electromagnet, but also the forces of a rubber member and a spring member biasing the armature away from the rotor. If the force attracting the armature to the rotor is larger than the forces biasing the armature away from the rotor, the armature is attracted to the rotor.

The force attracting the armature to the rotor by the energized electromagnet changes with the distance between the armature and the rotor, i.e., increases as the armature approaches the rotor. Specifically, when the armature is relatively remote from the rotor, the attracting force slowly increases as the armature approaches the rotor, whereas when the armature is relatively close to the rotor, the attracting force rapidly increases as the armature approaches the rotor. Namely, the closer the armature is located to the rotor, the more sharply the armature tends to accelerate.

Therefore, if a rubber member is used of which the rubber compressing load (i.e., the force necessary for compressing the rubber member) is small, it is impossible to restrain the acceleration of the armature right before the armature is attracted to the rotor, and thus to effectively reduce a collision sound by the armature and the rotor. On the other hand, if a rubber member is used of which the rubber compressing load is large, it turned out that in the stage in which the armature moves toward to the rotor, the combination of the respective forces, which the armature receives from the spring member and the rubber annulus so as to be biased away from the rotor, might temporarily become larger than the force attracting the armature to the rotor by the energized electromagnet, so that the armature might not be attracted to the rotor.

In the rotation transmission device of JP 2009-008172, similarly, if a rubber member is added between the armature and the rotor so as to reduce a collision sound by the armature and the rotor, the motion of the armature might be made unstable.

It is an object of the present invention to provide a rotation transmission device in which a collision sound by an armature and a rotor is less likely to occur, and further the armature is stably attracted to the rotor.

SUMMARY OF THE INVENTION

In order to achieve the above object, the present invention provides a rotation transmission device comprising: an outer ring; an inner member arranged inside of the outer ring, and supported so as to be rotatable relative to the outer ring; engaging elements provided between an inner periphery of the outer ring and an outer periphery of the inner member; an engaging element retainer supported so as to be movable between an engagement position in which the engaging elements are engaged with the outer ring and the inner member such that a rotation is transmitted between the outer ring and the inner member through the engaging elements, and a disengagement position in which the engaging elements are disengaged from the outer ring and the inner member such that the rotation is not transmitted between the outer ring and the inner member; an armature supported so as to be axially movable; a rotor supported so as to be axially unmovable, and axially opposed to the armature; a spring member biasing the armature away from the rotor; an electromagnet configured to attract the armature to the rotor when the electromagnet is energized; and a motion converting mechanism configured to convert a motion of the armature when attracted to the rotor into a movement of the engaging element retainer from one of the engagement position and the disengagement position to the other of the engagement position and the disengagement position. The rotation transmission device further comprises a buffer provided between the armature and the rotor so as to absorb a shock generated when the armature is attracted to the rotor, and the buffer comprises a metal annulus axially movably supported by one of the armature and the rotor, and a rubber annulus provided between the metal annulus and the one of the armature and the rotor such that as the armature approaches the rotor, the rubber annulus is axially compressed by the metal annulus and the one of the armature and the rotor. The rubber annulus has different axial thicknesses at different circumferential locations of the rubber annulus such that when a degree of axial compression of the rubber annulus is large, the rubber annulus is axially compressed in a longer circumferential area of the rubber annulus than when the degree of axial compression of the rubber annulus is small.

In this arrangement, since the rubber annulus has different axial thicknesses at different circumferential locations thereof such that when the degree of axial compression of the rubber annulus is large, the rubber annulus is axially compressed in its longer circumferential area than when the degree of axial compression of the rubber annulus is small. Therefore, in the stage in which the degree of axial compression of the rubber annulus is small, the force necessary for axially compressing the rubber annulus slowly increases as the armature approaches the rotor. In the stage in which the degree of axial compression of the rubber annulus is large, this force rapidly increases as the armature approaches the rotor. Therefore, when the armature is attracted to the rotor by energizing the electromagnet, it is possible to prevent the phenomenon that the combination of the respective forces, which the armature receives from the spring member(s) and the rubber annulus so as to be biased away from the rotor, becomes larger than the force attracting the armature to the rotor by the energized electromagnet. As a result thereof, the armature is stably attracted to the rotor. Also, it is possible to effectively restrain the acceleration of the armature right before the armature is attracted to the rotor, and thus to effectively reduce a collision sound by the armature and the rotor.

Moreover, when the armature is attracted to the rotor, the armature or the rotor indirectly comes into contact with the rubber annulus through the metal annulus. Therefore, instead of directly coming into contact with the rubber annulus, it is possible to use the rubber annulus which is higher in shock absorbability than an elastic member made of metal, while ensuring high durability of the rubber annulus.

The rubber annulus may comprise: an annular base portion having a uniform axial thickness; a plurality of first protrusions axially protruding from circumferentially spaced apart locations of the base portion; and a plurality of second protrusions axially protruding from circumferentially spaced apart locations of the base portion and lower in height than the first protrusions.

In this arrangement, when the rubber annulus is axially compressed, in the stage in which the degree of axial compression of the rubber annulus is relatively small (namely, the stage in which the first protrusions are axially compressed, but the second protrusions are not axially compressed), the force necessary for axially compressing the rubber annulus slowly increases as the armature approaches the rotor. In the stage in which the degree of axial compression of the rubber annulus is relatively large (namely, the stage in which both the first protrusions and the second protrusions are axially compressed), the force necessary for axially compressing the rubber annulus rapidly increases as the armature approaches the rotor. Also, by changing the dimensions of the first protrusions and the second protrusions, it is possible to easily adjust how the force necessary for axially compressing the rubber annulus increases.

Though the first protrusions and the second protrusions may be connected together such that no gaps are circumferentially defined, it is preferable that the second protrusions circumferentially alternate with, and are circumferentially spaced apart from, the first protrusions such that low portions which are lower in height than the second protrusions are defined between the first protrusions and the respective second protrusions.

In this arrangement, since the first protrusions are separated from the respective second protrusions by the low portions, which are lower in height than the second protrusions, when the first protrusions are axially compressed and thus deformed, the spaces between the first protrusions and the respective second protrusions can be used as "escapable places", namely, the places to which the first protrusions can escape or extend. Therefore, it is possible to compress the first protrusions with a small force.

It is preferable that the first protrusions are circumferentially equidistantly spaced apart from each other, and the second protrusions are circumferentially equidistantly spaced apart from each other.

In this arrangement, since the first protrusions are circumferentially equidistantly spaced apart from each other, and the second protrusions are also circumferentially equidistantly spaced apart from each other, when the rubber annulus is axially compressed, it is possible to uniformly compress the rubber annulus. Therefore, the attraction of the armature to the rotor is very stable.

It is preferable that the metal annulus comprises: an annular plate portion to which the rubber annulus is fixedly bonded; and an outer side tubular portion axially extending from an outer edge of the annular plate portion so as to cover an outer diameter side of the rubber annulus.

In this arrangement, even if a portion of the rubber annulus breaks and becomes a broken piece, the broken piece will be received by the outer side tubular portion of the metal annulus, and thus will not go to the outside of the metal annulus as a foreign object.

The metal annulus may further comprise an annular inner side protrusion extending from an inner edge of the annular plate portion toward a side on which the rubber annulus is arranged.

In this arrangement, even if a portion of the rubber annulus breaks and becomes a broken piece, the broken piece will not go to the radial inside of the metal annulus due to the inner side protrusion. As a result thereof, it is possible to further enhance safety.

EFFECTS OF THE INVENTION

In the rotation transmission device of the present invention, the rubber annulus has different axial thicknesses at different circumferential locations thereof such that when the degree of axial compression of the rubber annulus is large, the rubber annulus is axially compressed in its longer circumferential area than when the degree of axial compression of the rubber annulus is small. Therefore, in the stage in which the degree of axial compression of the rubber annulus is small, the force necessary for axially compressing the rubber annulus slowly increases as the armature approaches the rotor. In the stage in which the degree of axial compression of the rubber annulus is large, the force necessary for axially compressing the rubber annulus rapidly increases as the armature approaches the rotor. Therefore, it is possible to effectively reduce a collision sound by the armature and the rotor, and simultaneously to stably attract the armature to the rotor.

DETAILED DESCRIPTION OF THE INVENTION

Figure 1:
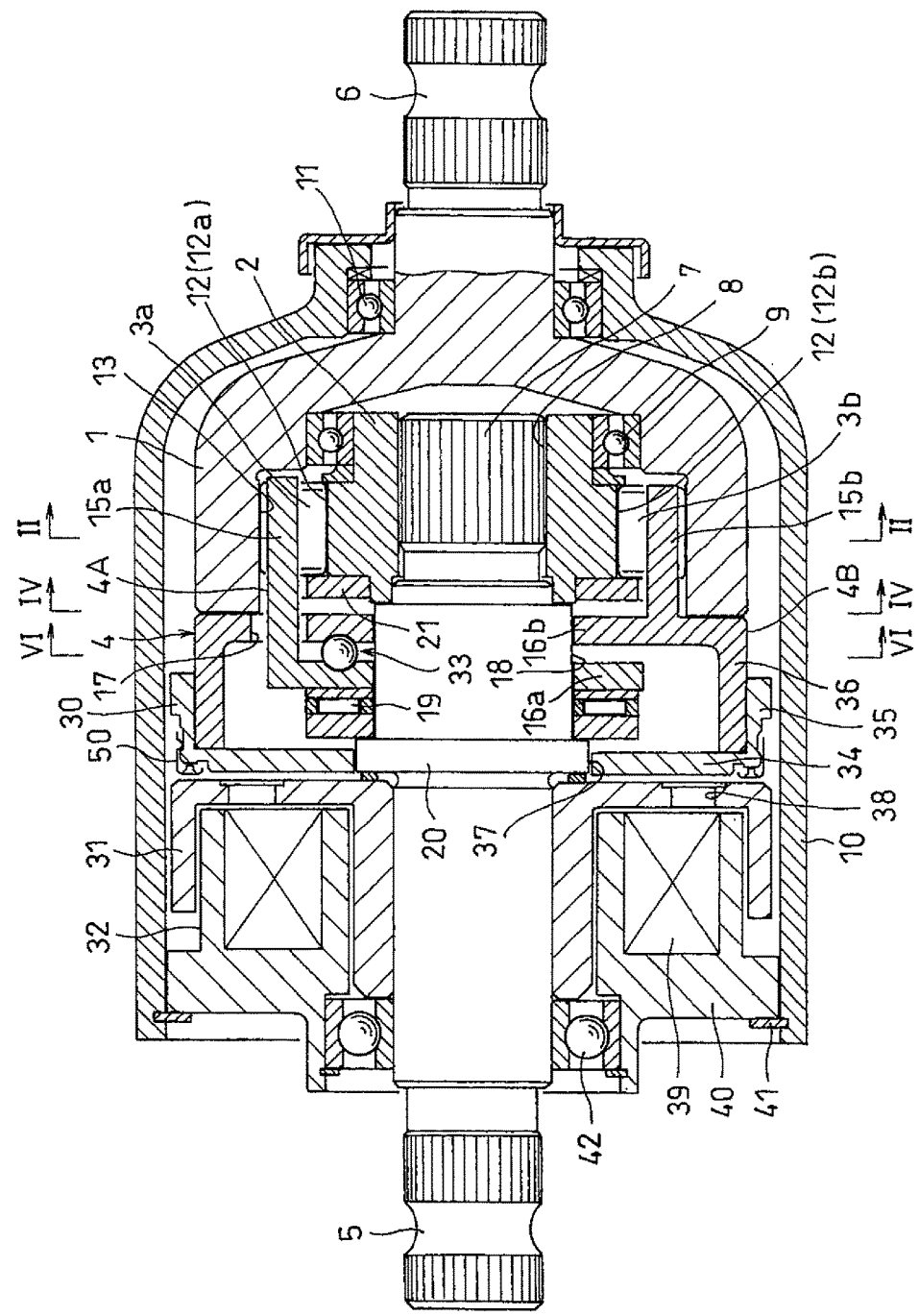
FIG. 1 is a sectional view of a rotation transmission device according to an embodiment of the present invention.

FIG. 1 illustrates a rotation transmission device according to the embodiment of the present invention. This rotation transmission device includes an outer ring 1, an inner member 2 arranged inside of the outer ring 1, a plurality of pairs of rollers 3a and 3b provided between the inner periphery of the outer ring 1 and the outer periphery of the inner member 2, and a roller retainer 4 retaining the rollers 3a and 3b. An input shaft 5 is connected to the inner member 2, and an output shaft 6 is connected to the outer ring 1 and arranged coaxially with the input shaft 5.

The input shaft 5 includes a serration shaft portion 7 formed in its outer periphery with serrations. The serration shaft portion 7 is fitted in a serration hole 8 formed in the center of the inner member 2. Due to the fitting of the serration shaft portion 7 in the serration hole 8, the input shaft 5 is connected to the inner member 2 so as to rotate together with the inner member 2. Though the input shaft 5 and the inner member 2 are separate members in this embodiment, the input shaft 5 and the inner member 2 may comprise an integral member having no joint.

The output shaft 6 is integral with the outer ring 1. Though the output shaft 6 and the outer ring 1 comprise an integral member having no joint in this embodiment, the output shaft 6 and the outer ring 1 may be separate members, with the output shaft 6 connected to the outer ring 1 so as to rotate together with the outer ring 1. A rolling bearing 9 is provided between the outer ring 1 and the inner member 2 so as to support the inner member 2 such that the inner member 2 is rotatable relative to the outer ring 1. A rolling bearing 11 rotatably supporting the output shaft 6 is provided at the end portion of a tubular housing 10 on the side of the output shaft 6, the housing 10 receiving the components constituting the rotation transmission device.

Figure 2:
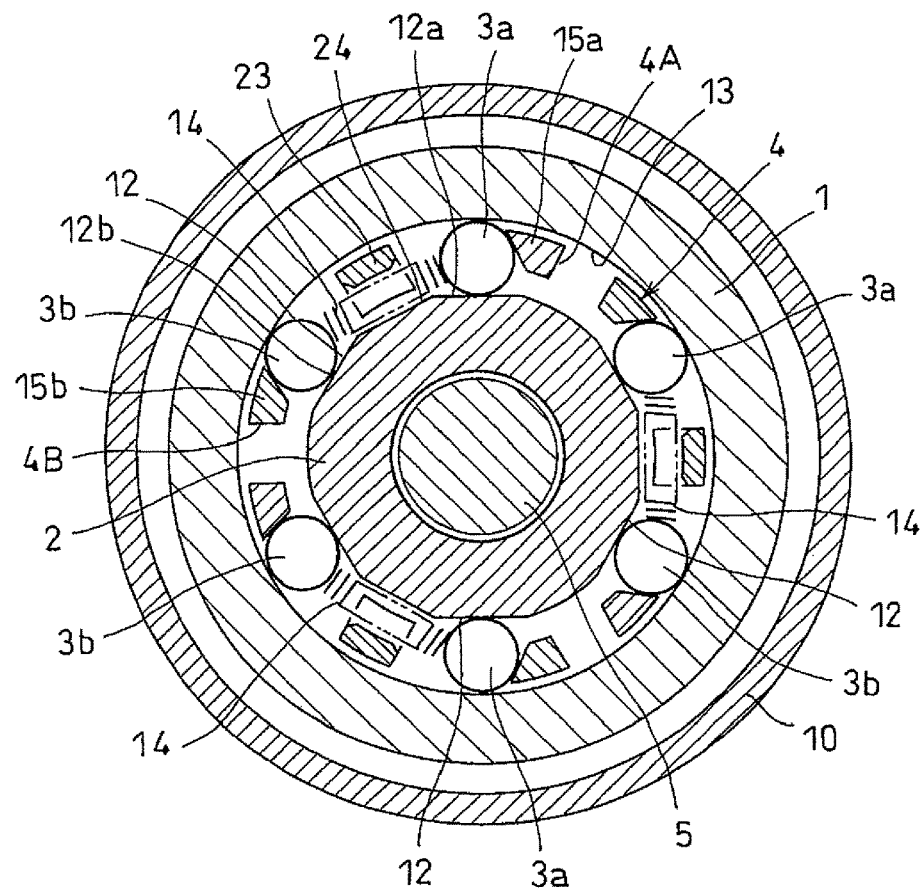
FIG. 2 is a sectional view taken along line II-II of FIG. 1.
Figure 3:
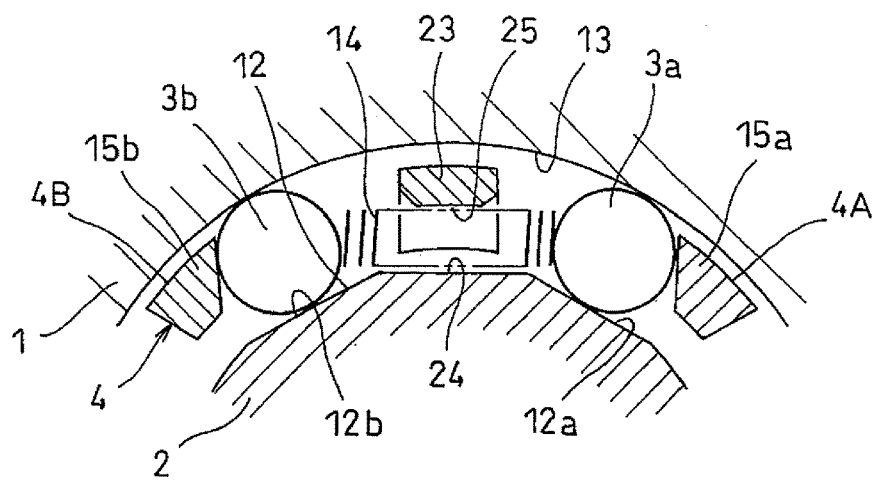
FIG. 3 is a sectional view illustrating by enlarging the vicinity of each pair of rollers which are circumferentially opposed to each other, and between which the spring member of FIG. 2 is arranged.

As illustrated in FIGS. 2 and 3, the inner member 2 is formed on its outer periphery with a plurality of cam surfaces 12 circumferentially equidistantly spaced apart from each other. The cam surfaces 12 are each constituted by a front cam surface portion 12a and a rear cam surface portion 12b arranged rearward of the front cam surface portion 12a in the normal rotation direction of the inner member 2 (hereinafter, simply referred to as "in the normal rotation direction"). The outer ring 1 is formed on its inner periphery with a cylindrical surface 13 radially opposed to the cam surfaces 12.

Each pair of rollers 3a and 3b are arranged between the corresponding cam surface 12 and the cylindrical surface 13 so as to be circumferentially opposed to each other with a spring member 14 disposed therebetween. For each pair of rollers 3a and 3b, the roller 3a, located forward in the normal rotation direction, is arranged between the front cam surface portion 12a and the cylindrical surface 13, and the roller 3b, located rearward in the normal rotation direction, is arranged between the rear cam surface portion 12b and the cylindrical surface 13. The spring members 14, arranged between the respective pairs of rollers 3a and 3b, press the rollers 3a and 3b such that the spaces between the respective pairs of rollers 3a and 3b widen.

Each front cam surface portion 12a is formed such that the radial distance between the front cam surface portion 12a and the cylindrical surface 13 gradually shortens from the position where there is the roller 3a when the roller 3a is not engaged, toward the front portion of the front cam surface 12a in the normal rotation direction. Each rear cam surface portion 12b is formed such that the radial distance between the rear cam surface 12b and the cylindrical surface 13 gradually shortens from the position where there is the roller 3b when the roller 3b is not engaged, toward the rear portion of the rear cam surface portion 12b in the normal rotation direction. Though the drawings illustrate that the front and rear cam surfaces 12a, 12b are formed as separate flat surfaces sloping in opposite directions to each other, the front and rear cam surface portions 12a and 12b may be formed on the same single flat surface such that the front portion of the single flat surface in the normal rotation direction constitutes the front cam surface portion 12a and the rear portion thereof constitutes the rear cam surface portion 12b. Also, though the front and rear cam surface portions 12a and 12b may be curved surfaces, by forming the front and rear cam surface portions 12a and 12b as flat surfaces as illustrated in the drawings, it is possible to reduce manufacturing costs.

As illustrated in FIGS. 1 to 3, the roller retainer 4 is constituted by a first split retainer portion 4A supporting the rollers 3a of the pairs of rollers 3a and 3b, each of which (the pairs) are circumferentially opposed to each other with the spring member 14 disposed therebetween, and a second split retainer portion 4B supporting the remaining rollers 3b. The first split retainer portion 4A and the second split retainer portion 4B are supported so as to be rotatable relative to each other, and support the rollers 3a and the rollers 3b, respectively, such that the spaces between the respective pairs of rollers 3a and 3b change with the relative rotation of the first and second split retainer portions 4A and 4B.

The first split retainer portion 4A includes a plurality of pillars 15a circumferentially spaced apart from each other, and an annular flange 16a through which end portions of the respective pillars 15a are coupled together. Similarly, the second split retainer portion 4B also includes a plurality of pillars 15b circumferentially spaced apart from each other, and an annular flange 16b through which end portions of the respective pillars 15b are coupled together.

The pillars 15a of the first split retainer portion 4A and the pillars 15b of the second split retainer portion 4B are inserted between the inner periphery of the outer ring 1 and the outer periphery of the inner member 2 such that each pair of rollers 3a and 3b, circumferentially opposed to each other with the spring member 14 disposed therebetween, are circumferentially sandwiched by the corresponding pillars 15a and 15b.

As illustrated in FIG. 1, the flange 16a of the first split retainer portion 4A and the flange 16b of the second split retainer portion 4B are axially opposed to each other with the flange 16b located axially closer to the inner member 2 than is the flange 16a. The flange 16b of the second split retainer portion 4B is formed with a plurality of circumferentially spaced apart cutouts 17 such that the pillars 15a of the first split retainer portion 4A can extend through the respective cutouts 17 without interfering with the flange 16b.

The inner periphery of the flange 16a of the first split retainer portion 4A and the inner periphery of the flange 16b of the second split retainer portion 4B are rotatably supported by/on a cylindrical surface 18 formed on the outer periphery of the input shaft 5. This enables the first and second split retainer portions 4A and 4B to move between the engagement position in which the pairs of rollers 3a and 3b are engaged with the cylindrical surface 13 and the respective cam surfaces 12 with the spaces between the respective pairs of rollers 3a and 3b widened, and the disengagement position in which the pairs of rollers 3a and 3b are disengaged from the cylindrical surface 13 and the respective cam surfaces 12 with the spaces between the respective pairs of rollers 3a and 3b narrowed. The flange 16a of the first split retainer portion 4A is axially supported through a thrust bearing 19 by an annular protrusion 20 formed on the outer periphery of the input shaft 5, to restrict the axial movement of the flange 16a.

Figure 4:
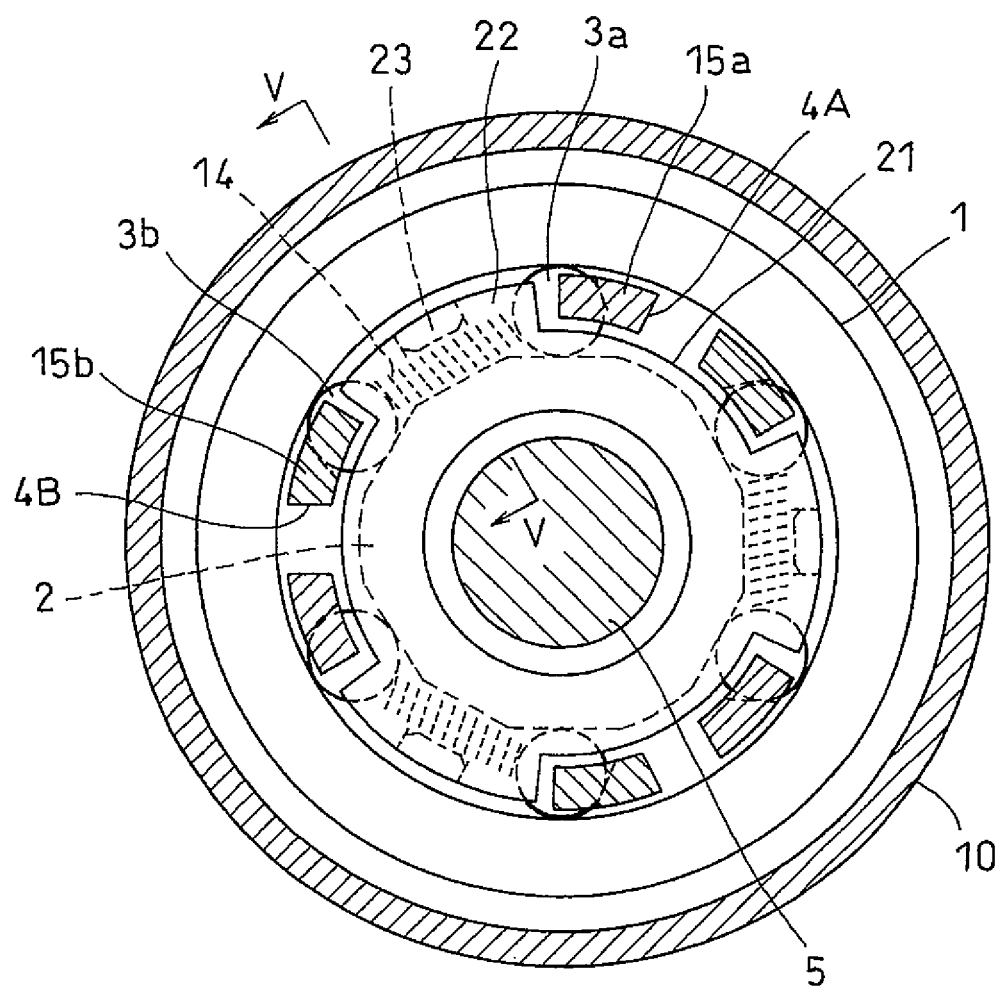
FIG. 4 is a sectional view taken along line IV-IV of FIG. 1.

As illustrated in FIG. 4, a side plate 21 is fixed to one side surface of the inner member 2. The side plate 21 includes stopper pieces 22 each located between the corresponding pillars 15a and 15b that are circumferentially opposed to each other with the rollers 3a and 3b disposed therebetween. When the pillars 15a and the pillars 15b move in the direction in which the spaces between the respective pairs of rollers 3a and 3b narrow, the stopper pieces 22 receive, on the respective side edges thereof, the pillars 15a and the pillars 15b, thereby making it possible to prevent the spring members 14, arranged between the respective pairs of rollers 3a and 3b, from being excessively compressed and thus breaking, and also to stabilize the positions of the rollers 3a and 3b relative to the inner member 2 when the spaces between the respective pairs of rollers 3a and 3b are narrowed.

Figure 5:
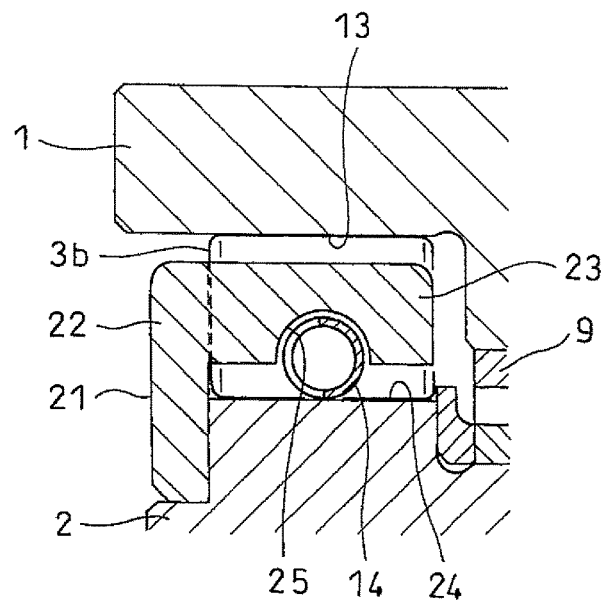
FIG. 5 is a sectional view taken along line V-V of FIG. 4.

As illustrated in FIG. 5, the side plate 21 includes spring holding pieces 23 holding the respective spring members 14. The spring holding pieces 23 are integral with the respective stopper pieces 22 so as to axially extend between the inner periphery of the outer ring 1 and the outer periphery of the inner member 2, and are radially opposed to spring supporting surfaces 24 (see FIG. 2) formed between the front cam surfaces 12a and the respective rear cam surfaces 12b of the outer periphery of the inner member 2. Recesses 25 are formed in the surfaces of the spring holding pieces 23 opposed to the respective spring supporting surfaces 24 such that the spring members 14 are received in the respective recesses 25. The spring members 14 are coil springs. The spring holding pieces 23 restrict the movement of the spring members 14 in their respective recesses 25, thereby preventing the spring members 14 from axially moving out of the space between the inner periphery of the outer ring 1 and the outer periphery of the inner member 2.

As illustrated in FIG. 1, this rotation transmission device includes, as a means for moving the first and second split retainer portions 4A and 4B from the engagement position to the disengagement position, an axially movably supported armature 30, a rotor 31 axially opposed to the armature 30, an electromagnet 32 configured to attract the armature 30 to the rotor 31 when the electromagnet 32 is energized, and a ball ramp mechanism 33 configured to convert the motion of the armature 30 when attracted to the rotor 31 into the movement of the first and second split retainer portions 4A and 4B from the engagement position to the disengagement position.

The armature 30 includes an annular disk portion 34, and a cylindrical portion 35 integral with the disk portion 34 and axially extending from the outer periphery of the disk portion 34. The second split retainer portion 4B includes a cylindrical portion 36 integral with the flange 16b and axially extending from the outer periphery of the flange 16b. The cylindrical portion 36 of the second split retainer portion 4B is press-fitted to the cylindrical portion 35 of the armature 30, so that the armature 30 is coupled to the second split retainer portion 4B so as to axially move together with the second split retainer portion 4B. Also, the armature 30 is supported by/on a cylindrical surface 37 formed on the outer periphery of the input shaft 5 so as to be rotatable and axially movable. The armature 30 is axially movably supported at two portions/surfaces axially spaced apart from each other (specifically, at the inner periphery of the armature 30 and the inner periphery of the second split retainer portion 4B). This prevents the armature 30 from tilting relative to the direction perpendicular to the input shaft 5.

The rotor 31 is arranged between the armature 30 and the electromagnet 32. Also, the rotor 31 is fitted on the outer periphery of the input shaft 5 with an interference, and thus supported on the outer periphery of the input shaft 5 so as to be movable in neither of the axial and circumferential directions. The rotor 31 and the armature 30 are each made of a ferromagnetic metal. In the surface of the rotor 31 opposed to the armature 30, a plurality of elongated holes 38 circumferentially elongated and axially penetrating the rotor 31 are formed so as to be circumferentially spaced apart from each other.

The electromagnet 32 includes a solenoid coil 39, and a field core 40 around which the solenoid coil 39 is wound. The field core 40 is inserted in the end portion of the housing 10 on the side of the input shaft 5, and prevented from separating from the housing 10 by a snap ring 41. A rolling bearing 42 is mounted to the inner periphery of the field core 40 so as to rotatably support the input shaft 5. When the solenoid coil 39 is energized, the electromagnet 32 forms a magnetic path passing through the field core 40, the rotor 31, and the armature 30, thereby attracting the armature 30 to the rotor 31. At this time, the surface of the armature 30 opposed to the rotor 31 is kept in surface contact with the surface of the rotor 31 opposed to the armature 30.

Figure 6:
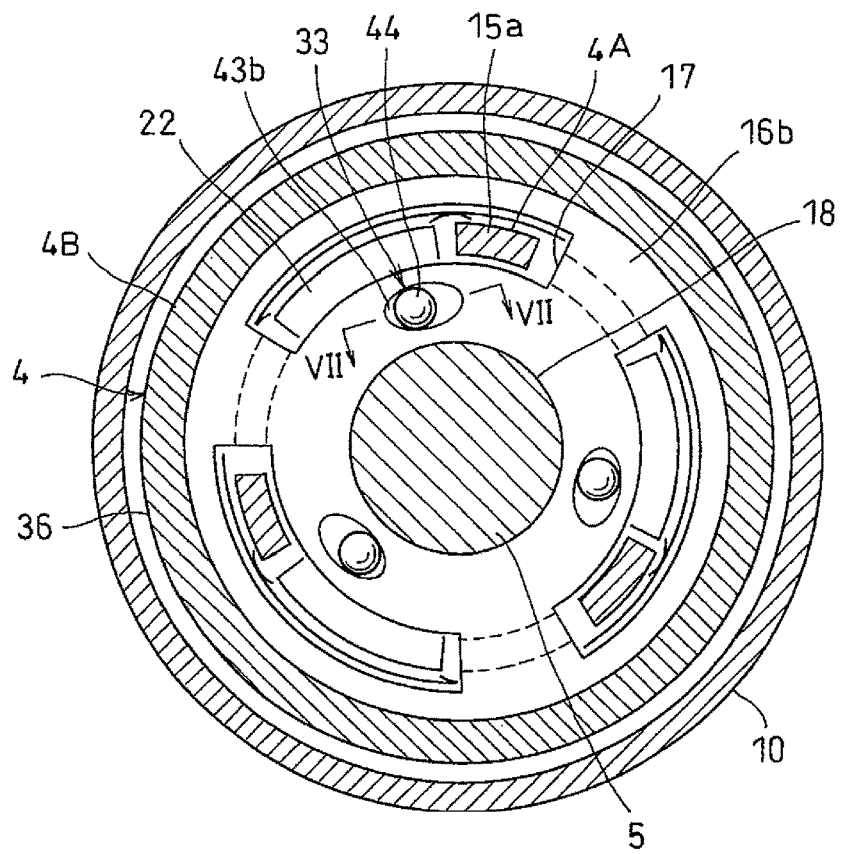
FIG. 6 is a sectional view taken along line VI-VI of FIG. 1.
Figure 7:
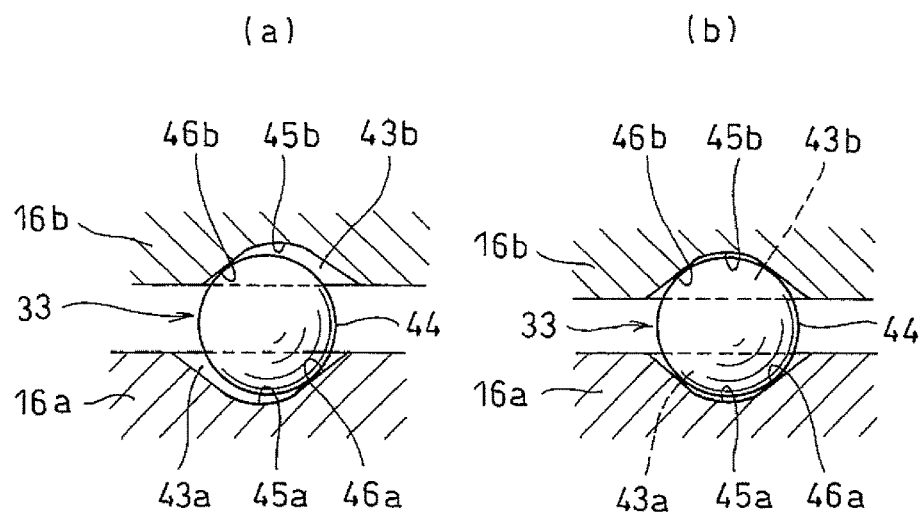
FIG. 7(a) is a sectional view taken along line VII-VII of FIG. 6.
FIG. 7(b) is a sectional view illustrating the state in which first and second split retainer portions have rotated relative to each other by each ball illustrated in FIG. 7(a) rolling toward the deepest portions of respective inclined grooves.

As illustrated in FIGS. 6, 7(a), and 7(b), the ball ramp mechanism 33 is constituted by inclined grooves 43a formed in the surface of the flange 16a of the first split retainer portion 4A opposed to the flange 16b of the second split retainer portion 4B, inclined grooves 43b formed in the surface of the flange 16b opposed to the flange 16a, and balls 44 received between the inclined grooves 43a and the respective inclined grooves 43b. The inclined grooves 43a and 43b extend in the circumferential direction. The inclined grooves 43a each includes a groove bottom 46a inclined so as to gradually become shallow from the axially deepest portion 45a of the groove 43a toward one of the opposite circumferential directions. The inclined grooves 43b each includes a groove bottom 46b inclined so as to gradually become shallow from the axially deepest portion 45b of the groove 43b toward the other of the opposite circumferential directions. The balls 44 are sandwiched between the groove bottoms 46a and the respective groove bottoms 46b.

The ball ramp mechanism 33 is configured such that when the flange 16b of the second split retainer portion 4B axially moves toward the flange 16a of the first split retainer portion 4A, each ball 44 rolls toward the deepest portions 45a and 45b of the inclined grooves 43a and 43b, thereby rotating the first and second split retainer portions 4A and 4B relative to each other so that the pillars 15a of the first split retainer portion 4A and the pillars 15b of the second split retainer portion 4B move in the direction in which the spaces between the respective pairs of rollers 3a and 3b narrow.

The armature 30 is biased away from the rotor 31 by the spring force of the spring members 14. Namely, the pressing force of the spring members 14 illustrated in FIG. 2, by which the rollers 3a and 3b are pressed such that the spaces between the respective pairs of rollers 3a and 3b widen, is transmitted, as a circumferential force, to the first split retainer portion 4A and the second split retainer portion 4B. This circumferential force is converted by the ball ramp mechanism 33 illustrated in FIGS. 6, 7(a), and 7(b) into the axial force by which the armature 30 is to be biased away from the rotor 31, and is transmitted to the second split retainer portion 4B. Since the armature 30 is fixed to the second split retainer portion 4B as illustrated in FIG. 1, by the force transmitted from the spring members 14 through the ball ram mechanism 33, the armature 30 is biased away from the rotor 31.

As illustrated in FIG. 1, a buffer 50 is provided between the armature 30 and the rotor 31 so as to absorb the shock generated when the armature 30 is attracted to the rotor 31.

Figure 8:
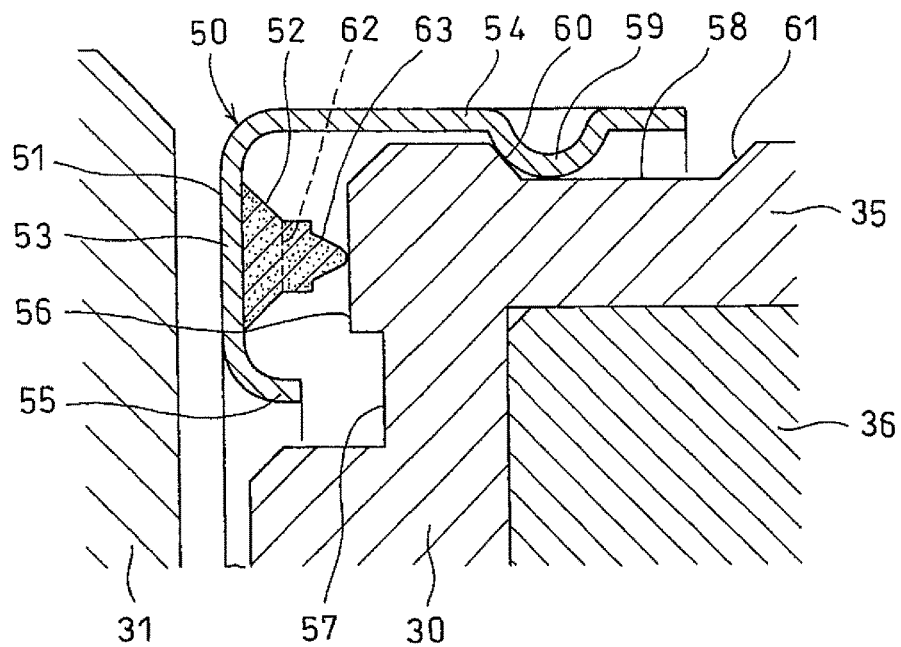
FIG. 8 is a sectional view illustrating by enlarging the vicinity of first protrusions of the buffer illustrated in FIG. 1.
Figure 9:
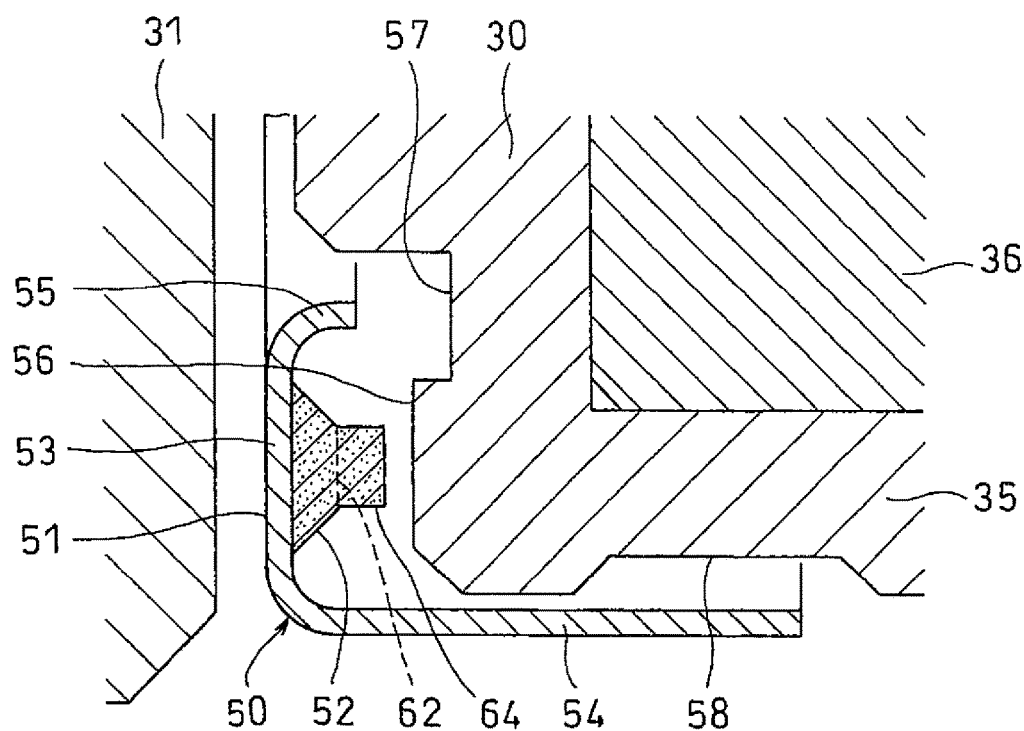
FIG. 9 is a sectional view illustrating by enlarging the vicinity of second protrusions of the buffer illustrated in FIG. 1.

As illustrated in FIGS. 8 and 9, the buffer 50 is constituted by a metal annulus 51 axially movably supported by the armature 30, and a rubber annulus 52 fixed to the metal annulus 51 so as to be axially compressed between the armature 30 and the metal annulus 51 as the armature 30 approaches the rotor 31. The metal annulus 51 is made of stainless steel (such as SUS304). The rubber annulus 52 is made of rubber (such as ethylene propylene diene rubber (EPDM)).

The metal annulus 51 includes an annular plate portion 53 to which the rubber annulus 52 is fixedly bonded, an outer side tubular portion 54 axially extending from the outer edge of the annular plate portion 53 so as to cover the outer diameter side of the rubber annulus 52, and an annular inner side protrusion 55 extending from the inner edge of the annular plate portion 53 toward the side on which the rubber annulus 52 is arranged.

On the other hand, the armature 30 is formed in its surface opposed to the rotor 31 with an annular recess 56 which opens to the outer periphery of the armature 30, and an annular groove 57 adjoining the inner diameter side of the annular recess 56. The metal annulus 51 is mounted to the armature 30 such that the annular plate portion 53 is axially opposed to the annular recess 56 of the armature 30 through the rubber annulus 52, and such that the outer side tubular portion 54 is radially opposed to the outer periphery of the armature 30. When the electromagnet 32 is de-energized and thus the armature 30 is separated from the rotor 31, the annular plate portion 53 protrudes further toward the rotor 31 than the surface of the armature 30 opposed to the rotor 31 under the elastic restoring force of the rubber annulus 52.

As illustrated in FIG. 8, the outer side tubular portion 54 of the metal annulus 51 is formed with an anti-separation protrusion 59 engaging in a circumferential groove 58 formed in the outer periphery of the armature 30. By coming into contact with the inner side surface 60 of the circumferential groove 58 close to the rotor 31, the anti-separation protrusion 59 restricts the movement of the metal annulus 51 in the direction in which the metal annulus 51 approaches the rotor 31, thereby preventing the buffer 50 from separating from the armature 30. The anti-separation protrusion 59 is formed by pressing the outer side tubular portion 54 such that an opening radially penetrating the outer side tubular portion 54 is never formed.

The circumferential groove 58 of the outer periphery of the armature 30 is formed such that the anti-separation protrusion 59 can axially move to some extent within the circumferential groove 58 so as to allow the metal annulus 51 to axially move as the rubber annulus 52 is axially compressed. Namely, the axial width of the circumferential groove 58 is set to be larger than that of the anti-separation protrusion 59 such that the anti-separation protrusion 59 can move away from the rotor 31 within the circumferential groove 58. This makes it possible to prevent the anti-separation protrusion 59 from interfering with the inner side surface 61 of the circumferential groove 58 remote from the rotor 31 when the rubber annulus 52 is axially compressed, and thus to axially move the metal annulus 51 as the rubber annulus 52 is axially compressed.

The annular groove 57, formed in the surface of the armature 30 opposed to the rotor 31, is axially opposed to the inner side protrusion 55 of the metal annulus 51. An axial gap is defined between the inner side protrusion 55 and the annular groove 57 such that the inner side protrusion 55 never comes into contact with the inner surface of the annular groove 57 when the armature 30 is attracted to the rotor 31. Also, the inner side protrusion 55 of the metal annulus 51 is shaped and arranged such that with the anti-separation protrusion 59 kept in contact with the inner side surface 60 of the circumferential groove 58 close to the rotor 31, the distal end of the inner side protrusion 55 is located within the annular recess 56 (namely, the distal end of the inner side protrusion 55 is located inside of the surface of the armature 30 opposed to the rotor 31).

The rubber annulus 52 is boned by vulcanization to the surface of the annular plate portion 53 opposite from its surface to be brought into contact with the rotor 31. As can be seen from FIGS. 8-10, the rubber annulus 52 has different axial thicknesses at different circumferential locations thereof such that when the degree of axial compression of the rubber annulus 52 is large, the rubber annulus 52 is axially compressed over a larger circumferential area thereof than when the degree of axial compression of the rubber annulus 52 is small.

In this embodiment, as illustrated in FIGS. 10 to 13, the rubber annulus 52, having such a shape, includes an annular base portion 62 having a uniform axial thickness, a plurality of first protrusions 63 axially protruding from circumferentially spaced apart locations of the base portion 62, and a plurality of second protrusions 64 axially protruding from circumferentially spaced apart locations of the base portion 62 and lower in height (axial thickness) than the first protrusions 63. With this arrangement, when the rubber annulus 52 is axially compressed, and while the degree of axial compression is relatively small, only the first protrusions 63 (of the first and second protrusions 63 and 64) are axially compressed, whereas when the degree of axial compression is relatively large, both the first protrusions 63 and the second protrusions 64 are axially compressed. The base portion 62 has a trapezoidal section, that is, the radial width of the base portion 62 increases toward the annular plate portion 53. This prevents the base portion 62 from tilting relative to the axial direction when the rubber annulus 52 is axially compressed, and thus prevents the first protrusions 63 and the second protrusions 64 from toppling down.

Figure 10:
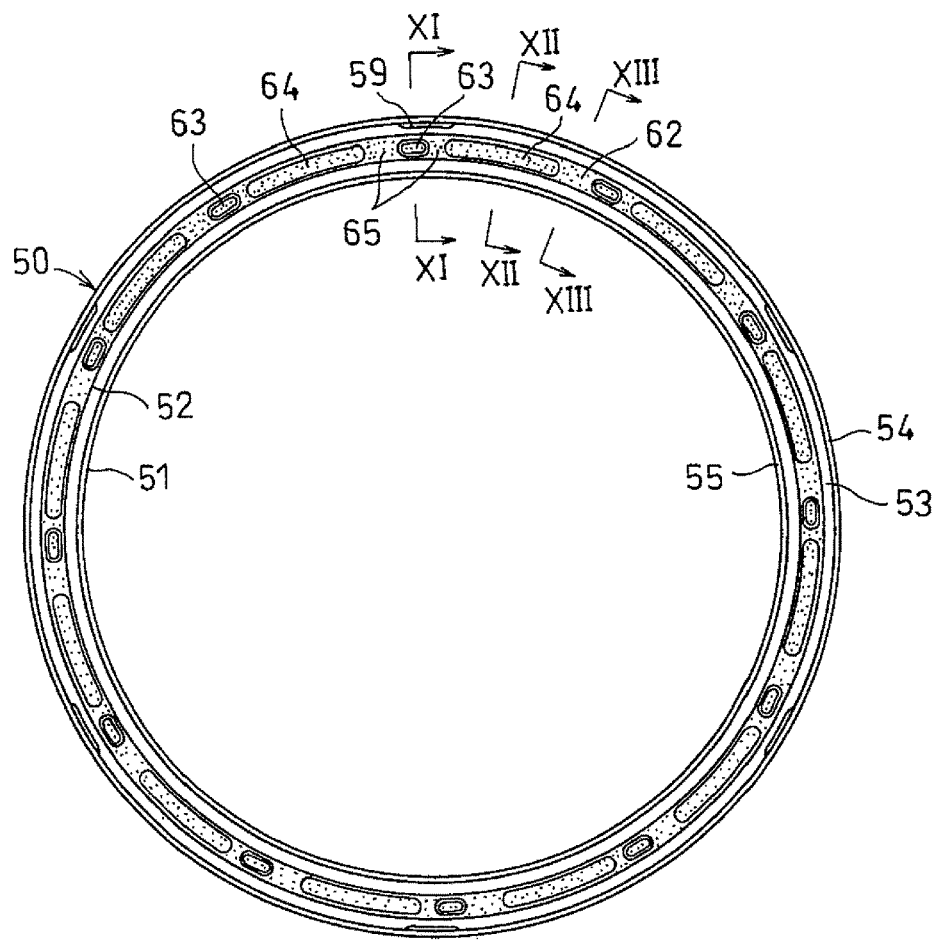
FIG. 10 is a view illustrating the buffer illustrated in FIG. 1 which is taken out and axially seen from the side of a rubber annulus.
Figure 11:
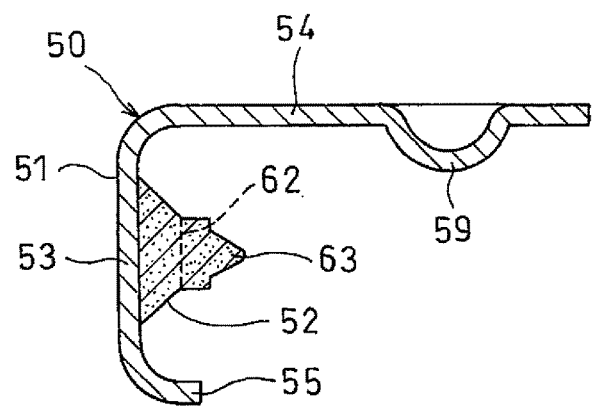
FIG. 11 is a sectional view taken along line XI-XI of FIG. 10.
Figure 12:
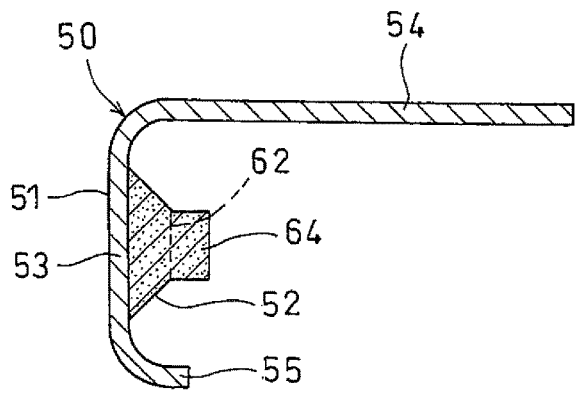
FIG. 12 is a sectional view taken along line XII-XII of FIG. 10.
Figure 13:
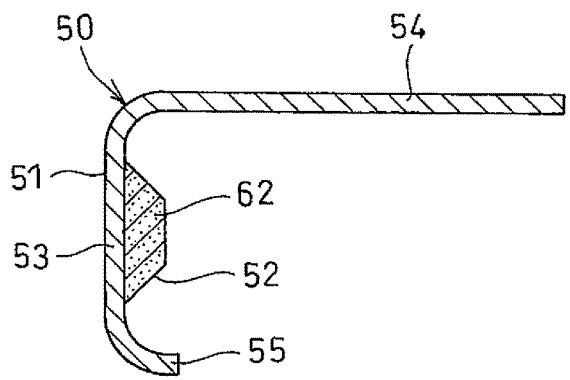
FIG. 13 is a sectional view taken along line XIII-XIII of FIG. 10.

As illustrated in FIG. 10, the first protrusions 63 and the second protrusions 64 are arranged on the same circumference. The circumferential lengths of all of the first protrusions 63 are set such that the first protrusions 63 account for 10 to 20% of the entire circumference of the base portion 62. The circumferential lengths of all of the second protrusions 64 are set such that the second protrusions 64 account for 50 to 70% of the entire circumference of the base portion 62. The first protrusions 63 are circumferentially equidistantly spaced apart from each other, and the second protrusions 64 are also circumferentially equidistantly spaced apart from each other.

The second protrusions 64 circumferentially alternate with, and are circumferentially spaced apart from, the first protrusions 63 such that low portions 65 which are lower in height (axial thickness) than the second protrusions 64 are defined between the first protrusions 63 and the respective second protrusions 64. Namely, the low portions 65 (portions identical in height to the base portion 62 in FIG. 10), which are lower in height (axial thickness) than the second protrusions 64, are defined between the first protrusions 63 and the respective second protrusions 64 such that the first protrusions 63 and the second protrusions 64 are disconnected/separated from each other.

As illustrated in FIG. 8, the heights of the first protrusions 63 are set such that even when the anti-separation protrusion 59 are in contact with the inner side surface 60 of the circumferential groove 58 close to the rotor 31, the first protrusions 63 are not separated from, but kept in contact with, the inner surface of the annular recess 56. This prevents the buffer 50 from becoming unstable with the armature 30 separated from the rotor 31.

It is now described how this rotation transmission device operates.

As illustrated in FIG. 1, while the electromagnet 32 is de-energized, this rotation transmission device is in the engaged state in which rotation is transmitted between the outer ring 1 and the inner member 2. Namely, while the electromagnet 32 is de-energized, the armature 30 is kept away from the rotor 31 by the spring force of the spring members 14. At this time, by the spring force of the spring members 14, which press the respective pairs of rollers 3a and 3b such that the spaces between the respective pairs of rollers 3a and 3b widen, the rollers 3a, located forward in the normal rotation direction, are kept in engagement with the cylindrical surface 13 of the inner periphery of the outer ring 1 and the respective front cam surfaces 12a of the outer periphery of the inner member 2, and the rollers 3b, located rearward in the normal rotation direction, are kept in engagement with the cylindrical surface 13 of the inner periphery of the outer ring 1 and the respective rear cam surfaces 12b of the outer periphery of the inner member 2. In this state, when the inner member 2 rotates in the normal rotation direction, this rotation is transmitted to the outer ring 1 from the inner member 2 through the rollers 3b, located rearward in the normal rotation direction. When the inner member 2 rotates in the reverse rotation direction, this rotation is transmitted to the outer ring 1 from the inner member 2 through the rollers 3a, located forward in the normal rotation direction.

On the other hand, while the electromagnet 32 is energized, this rotation transmission device is in the disengaged state (idling state) in which rotation is not transmitted between the outer ring 1 and the inner member 2. Namely, when the electromagnet 32 is energized, the armature 30 is attracted to the rotor 31, and due to this motion of the armature 30, the flange 16b of the second split retainer portion 4B axially moves toward the flange 16a of the first split retainer portion 4A. At this time, each ball 44 of the ball ramp mechanism 33 rolls toward the deepest portions 45a and 45b of the respective inclined grooves 43a and 43b, so that the first and second split retainer portions 4A and 4B rotate relative to each other. Due to the relative rotation of the first and second split retainer portions 4A and 4B, the pillars 15a of the first split retainer portion 4A and the pillars 15b of the second split retainer portion 4B press the rollers 3a and the rollers 3b, respectively, such that the spaces between the respective pairs of rollers 3a and 3b narrow. As a result thereof, the rollers 3a, located forward in the normal rotation direction, are disengaged from the cylindrical surface 13 of the inner periphery of the outer ring 1 and the respective front cam surfaces 12a of the outer periphery of the inner member 2, and the rollers 3b, located rearward in the normal rotation direction, are also disengaged from the cylindrical surface 13 of the inner periphery of the outer ring 1 and the respective rear cam surfaces 12b of the outer periphery of the inner member 2. In this state, even if rotation is input to the inner member 2, this rotation is not transmitted to the outer ring 1 from the inner member 2, so that the inner member 2 idles.

When the electromagnet 32 is energized, the armature 30 receives not only the force attracting the armature 30 to the rotor 31 by the energized electromagnet 32, but also the forces of the rubber annulus 52 and the spring members 14 biasing the armature 30 away from the rotor 31. However, since the force attracting the armature 30 is larger than the combined forces biasing the armature 30 away from the rotor 31, the armature 30 is attracted to the rotor 31.

Figure 14:
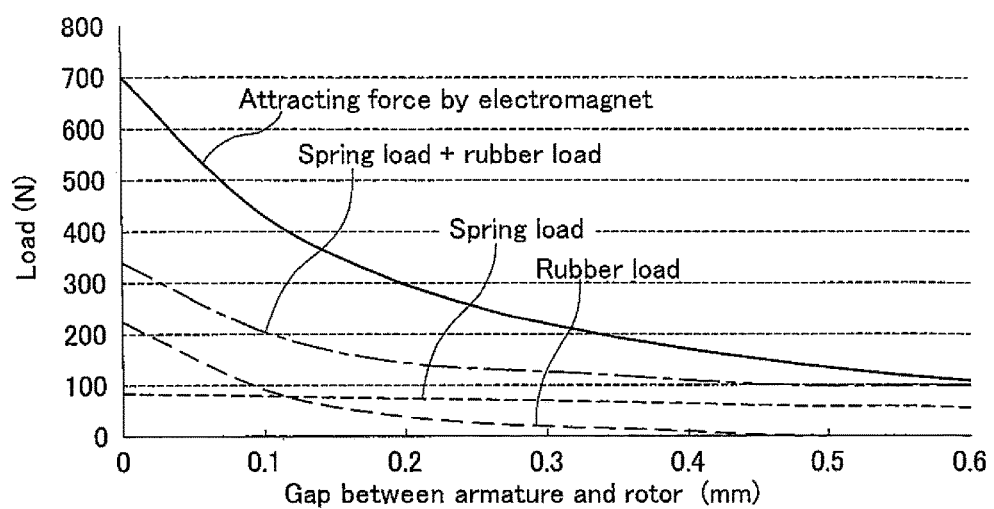
FIG. 14 is a view illustrating, in the rotation transmission device according to the embodiment of the present invention, how the force attracting an armature to a rotor, the combination of a spring load and a rubber compressing load, the spring load, and the rubber compressing load change with the distance between the armature and the rotor.
Figure 15:
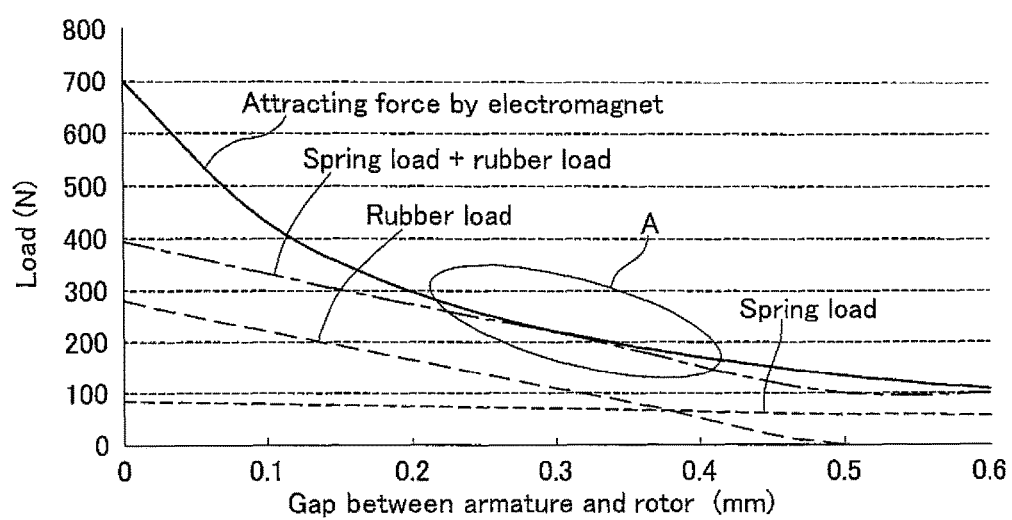
FIG. 15 is a view illustrating how the force attracting the armature to the rotor, the combination of the spring load and the rubber compressing load, the spring load, and the rubber compressing load change with the distance between the armature and the rotor, if instead of the rubber annulus illustrated in FIGS. 10 to 13, a rubber annulus is used which is configured such that the total circumferential length of the portions of the rubber annulus that are axially compressed does not change irrespective of the degree of axial compression of the rubber annulus.

As illustrated in FIGS. 14 and 15, the force attracting the armature 30 to the rotor 31 by the energized electromagnet 32 changes with the distance between the armature 30 and the rotor 31, i.e., increases as the armature 30 approaches the rotor 31. Specifically, when the armature 30 is relatively remote from the rotor 31, the attracting force slowly increases as the armature 30 approaches the rotor 31, whereas when the armature 30 is relatively close to the rotor 31, the attracting force rapidly increases as the armature 30 approaches the rotor 31. Namely, if only the force attracting the armature 30 by the electromagnet 32 is taken into consideration, the closer the armature 30 is located to the rotor 31, the more sharply the armature 30 tends to accelerate.

On the other hand, the force of the spring members 14 biasing the armature 30 away from the rotor 31 (hereinafter, this force is referred to as "spring load"), and the force necessary for axially compressing the rubber annulus 52 (hereinafter, this force is referred to as "rubber compressing load") also increase as the armature 30 approaches the rotor 31. The spring load increases substantially at a constant rate, i.e., increases linearly. The rubber compressing force also increases substantially at a constant rate, i.e. increases linearly as indicated in FIG. 15, if a rubber annulus is used which is configured such that the total circumferential length of the portions of the rubber annulus that are axially compressed does not change irrespective of the degree of axial compression of the rubber annulus (e.g., a rubber annulus having a uniform axial thickness over its entire circumference).

Therefore, if instead of the rubber annulus 52 of the above embodiment, a rubber annulus is used which is configured such that the total circumferential length of the portions of the rubber annulus that are compressed does not change irrespective of the degree of axial compression of the rubber annulus, as illustrated in FIG. 15, in the stage in which the distance between the armature 30 and the rotor 31 is relatively large (namely, in the area indicated by reference sign A in FIG. 15), the combination of the spring load and the rubber compressing load, which the armature 30 receives from the spring members 14 and the rubber annulus 52 so as to be biased away from the rotor 31, might temporarily become larger than the attracting force by the electromagnet 32, which attracts the armature 30 to the rotor 31 when the electromagnet 32 is energized. If this phenomenon actually occurs, the armature 30 might not be attracted to the rotor 31, so that the motion of the armature 30 might be made unstable.

In contrast thereto, in the rotation transmission device of the above embodiment, the rubber annulus 52 is used, which has different axial thicknesses at different circumferential locations thereof such that when the degree of axial compression of the rubber annulus 52 is large, the rubber annulus 52 is axially compressed in its longer circumferential area than when the degree of axial compression of the rubber annulus 52 is small. Therefore, as illustrated in FIG. 14, in the stage in which the degree of axial compression of the rubber annulus 52 is small (namely, the stage in which the first protrusions 63 are axially compressed, but the second protrusions 64 are not axially compressed; specifically, the stage in FIG. 14 in which the gap/distance between the armature 30 and the rotor 31 is approximately 0.2 to 0.5 mm), the rubber compressing load slowly increases as the armature 30 approaches the rotor 31, whereas in the stage in which the degree of axial compression of the rubber annulus 52 is large (namely, the stage in which both the first protrusions 63 and the second protrusions 64 are axially compressed; specifically, the stage in FIG. 14 in which the gap/distance between the armature 30 and the rotor 31 is approximately 0 to 0.2 mm.), the rubber compressing load rapidly increases as the armature 30 approaches the rotor 31. Therefore, when the armature 30 is attracted to the rotor 31 by energizing the electromagnet 32, it is possible to prevent the phenomenon that the combination of the spring load and the rubber compressing load, which the armature 30 receives from the spring members 14 and the rubber annulus 52 so as to be biased away from the rotor 31, becomes larger than the attracting force by the electromagnet 32 attracting the armature 30 to the rotor 31 when the electromagnet 32 is energized. As a result thereof, the armature 30 is stably attracted to the rotor 31. Also, it is possible to effectively restrain the acceleration of the armature 30 right before the armature 30 is attracted to the rotor 31, and thus to effectively reduce a collision sound by the armature 30 and the rotor 31.

Moreover, since, when the armature 30 is attracted to the rotor 31, the armature 30 or the rotor 31 indirectly comes into contact with the rubber annulus 52 through the metal annulus 51, instead of directly coming into contact with the rubber annulus 52, it is possible to use the rubber annulus 52, which is higher in shock absorbability than an elastic member made of metal, while ensuring high durability of the rubber annulus 52.

In the rotation transmission device of the above embodiment, as illustrated in FIGS. 10 to 13, the rubber annulus 52 is used, which includes the annular base portion 62, which has a uniform axial thickness, the first protrusions 63, which axially protrude from circumferentially spaced apart locations of the base portion 62, and the second protrusions 64, which axially protrude from circumferentially spaced apart locations of the base portion 62 and which are lower in height than the first protrusions 63. Therefore, by changing the dimensions (especially, the circumferential lengths) of the first protrusions 63 and the second protrusions 64, it is possible to easily adjust how the force necessary for axially compressing the rubber annulus 52 increases.

Though the first protrusions 63 and the second protrusions 64 may be connected together such that no gaps are circumferentially defined, in this embodiment, as illustrated in FIG. 10, the second protrusions 64 circumferentially alternate with, and are circumferentially spaced apart from, the first protrusions 63 such that the low portions 65, which are lower in height than the second protrusions 64, are defined between the first protrusions 63 and the respective second protrusions 64. In this arrangement, since the first protrusions 63 are separated from the respective second protrusions 64 by the low portions 65, which are lower in height than the second protrusions 64, when the first protrusions 63 are axially compressed and thus deformed, the spaces between the first protrusions 63 and the respective second protrusions 64 can be used as "escapable places" for the first protrusions 63, namely, as the places to which the first protrusions 63 can circumferentially escape or extend. Therefore, it is possible to compress the first protrusions 63 with a small force.

In the rotation transmission device of the above embodiment, as illustrated in FIG. 10, since the first protrusions 63 are circumferentially equidistantly spaced apart from each other, and the second protrusions 64 are also circumferentially equidistantly spaced apart from each other, when the rubber annulus 52 is axially compressed, it is possible to uniformly compress the rubber annulus 52. Therefore, the motion of the armature 30 when attracted to the rotor 31 is very stable.

In the rotation transmission device of the above embodiment, as illustrated in FIGS. 8 and 9, the metal annulus 51 includes the outer side tubular portion 54, extending so as to cover the outer diameter side of the rubber annulus 52. Therefore, even if a portion of the rubber annulus 52 breaks and becomes a broken piece, the broken piece will be received by the outer side tubular portion 54 of the metal annulus 51, and thus will not go to the outside of the metal annulus 51 as a foreign object. As a result thereof, it is possible to prevent the phenomenon that the rollers 3a and 3b fail to engage properly due to the entry of such a broken piece.

In the rotation transmission device of the above embodiment, the metal annulus 51 includes the annular inner side protrusion 55, extending from the inner edge of the annular plate portion 53. Therefore, even if a portion of the rubber annulus 52 breaks and becomes a broken piece, the broken piece will not go to the radial inside of the metal annulus 51. As a result thereof, it is possible to effectively prevent the phenomenon that the rollers 3a and 3b fail to engage properly due to the entry of such a broken piece.

Though the buffer 50 is mounted to the armature 30 in the above embodiment, the buffer 50 may be mounted to not the armature 30 but the rotor 31.

Though in the above embodiment, the ball ramp mechanism 33 is used as a motion converting mechanism configured to convert the motion of the armature 30 when attracted to the rotor 31 into the movement of the roller retainer 4 to the disengagement position from the engagement position, a different type motion converting mechanism may be used, such as a clutch mechanism as disclosed in Patent document 2.

Though in the above embodiment, the cylindrical surface 13 is formed on the inner periphery of the outer ring 1, and the cam surfaces 12 are formed on the outer periphery of the inner member 2, the rotation transmission mechanism may be configured such that the cam surfaces 12 (the front cam surfaces 12a and the rear cam surfaces 12b) are formed on the inner periphery of the outer ring 1, the cylindrical surface 13 is formed on the outer periphery of the inner member 2, and the pairs of rollers 3a and 3b are mounted between the respective cam surfaces 12 of the inner periphery of the outer ring 1 and the cylindrical surface 13 of the outer periphery of the inner member 2.

Though in the above embodiment, the rollers 3a and 3b are used as engaging elements mounted between the inner periphery of the outer ring 1 and the outer periphery of the inner member 2, engaging elements other than such rollers may be used. For example, a plurality of sprags (not shown) configured such that their height changes according to their posture may be mounted between a cylindrical surface formed on the inner periphery of the outer ring 1 and a cylindrical surface formed on the outer periphery of the inner member 2 such that while standing, the sprags are engaged with the inner periphery of the outer ring 1 and the outer periphery of the inner member 2, and while toppling down, the sprags are disengaged therefrom.

The above embodiments are merely examples in every respect, and the present invention is not limited to the above embodiments. Also, it should be understand that the scope of the present invention is indicated by not the above explanations but the claims, and can include all modifications within the scope of the claims or within the meaning equivalent to the scope of the claims.

DESCRIPTION OF REFERENCE NUMERALS

1: outer ring
2: inner member
3a, 3b: roller
4: roller retainer
14: spring member
30: armature
31: rotor
32: electromagnet
33: ball ramp mechanism
50: buffer
51: metal annulus
52: rubber annulus
53: annular plate portion
54: outer side tubular portion
55: inner side protrusion
62: base portion
63: first protrusion
64: second protrusion
65: low portion which is lower in height than the second protrusion 64

The invention claimed is:
1. A rotation transmission device comprising:
an outer ring;
an inner member arranged inside of the outer ring, and supported so as to be rotatable relative to the outer ring;
engaging elements provided between an inner periphery of the outer ring and an outer periphery of the inner member;
an engaging element retainer supported so as to be movable between an engagement position in which the engaging elements are engaged with the outer ring and the inner member such that rotation is transmitted between the outer ring and the inner member through the engaging elements, and a disengagement position in which the engaging elements are disengaged from the outer ring and the inner member such that the rotation is not transmitted between the outer ring and the inner member;
an armature supported so as to be axially movable;
a rotor supported so as to be axially unmovable, and axially opposed to the armature;
a spring member biasing the armature away from the rotor;
an electromagnet configured to attract the armature to the rotor when the electromagnet is energized;
a motion converting mechanism configured to convert a motion of the armature when attracted to the rotor into a movement of the engaging element retainer from one of the engagement position and the disengagement position to the other of the engagement position and the disengagement position, and
a buffer provided between the armature and the rotor so as to absorb a shock generated when the armature is attracted to the rotor,
wherein the buffer comprises a metal annulus axially movably supported by one of the armature and the rotor, and a rubber annulus provided between the metal annulus and said one of the armature and the rotor such that as the armature approaches the rotor, the rubber annulus is axially compressed by the metal annulus and said one of the armature and the rotor,
wherein the rubber annulus has different axial thicknesses at different circumferential locations of the rubber annulus such that when a degree of axial compression of the rubber annulus is large, the rubber annulus is axially compressed in a longer circumferential area of the rubber annulus than when the degree of axial compression of the rubber annulus is small,
wherein the rubber annulus comprises:
an annular base portion having a uniform axial thickness;
a plurality of first protrusions axially protruding from a first group of circumferentially spaced apart locations of the base portion; and
a plurality of second protrusions axially protruding from a second group of circumferentially spaced apart locations of the base portion and having axial heights smaller than axial heights of the first protrusions,
wherein the metal annulus includes an anti-separation protrusion engaging in a circumferential groove formed in an outer periphery of the armature, the circumferential groove having an inner side surface on an axial side of the circumferential groove closest to the rotor, and
wherein the axial heights of the first protrusions are such that, when the anti-separation protrusion is in contact with the inner side surface of the circumferential groove, the first protrusions are in contact with the armature.

2. The rotation transmission device according to claim 1, wherein the second protrusions circumferentially alternate with, and are circumferentially spaced from, the first protrusions such that low portions which are lower in height than the second protrusions are defined between the first protrusions and the respective second protrusions.

3. The rotation transmission device according to claim 2, wherein the first protrusions are circumferentially equidistantly spaced apart from each other, and the second protrusions are circumferentially equidistantly spaced apart from each other.

4. The rotation transmission device according to claim 3, wherein the metal annulus comprises:
an annular plate portion to which the rubber annulus is fixedly bonded; and
an outer side tubular portion axially extending from an outer edge of the annular plate portion so as to cover an outer diameter side of the rubber annulus.

5. The rotation transmission device according to claim 4, wherein the metal annulus further comprises an annular inner side protrusion extending from an inner edge of the annular plate portion toward a side on which the rubber annulus is arranged.

6. The rotation transmission device according to claim 2, wherein the metal annulus comprises:
   an annular plate portion to which the rubber annulus is fixedly bonded; and
   an outer side tubular portion axially extending from an outer edge of the annular plate portion so as to cover an outer diameter side of the rubber annulus.

7. The rotation transmission device according to claim 6, wherein the metal annulus further comprises an annular inner side protrusion extending from an inner edge of the annular plate portion toward a side on which the rubber annulus is arranged.

8. The rotation transmission device according to claim 1, wherein the first protrusions are circumferentially equidistantly spaced apart from each other, and the second protrusions are circumferentially equidistantly spaced apart from each other.

9. The rotation transmission device according to claim 8, wherein the metal annulus comprises:
   an annular plate portion to which the rubber annulus is fixedly bonded; and
   an outer side tubular portion axially extending from an outer edge of the annular plate portion so as to cover an outer diameter side of the rubber annulus.

10. The rotation transmission device according to claim 9, wherein the metal annulus further comprises an annular inner side protrusion extending from an inner edge of the annular plate portion toward a side on which the rubber annulus is arranged.

11. The rotation transmission device according to claim 1, wherein the metal annulus comprises:
   an annular plate portion to which the rubber annulus is fixedly bonded; and
   an outer side tubular portion axially extending from an outer edge of the annular plate portion so as to cover an outer diameter side of the rubber annulus.

12. The rotation transmission device according to claim 11, wherein the metal annulus further comprises an annular inner side protrusion extending from an inner edge of the annular plate portion toward a side on which the rubber annulus is arranged.

* * * * *